United States Patent [19]

Kobayashi et al.

[11] 4,298,772

[45] Nov. 3, 1981

[54] COORDINATE READER USING ADJUSTABLE MAGNETOSTRICTIVE OSCILLATIONS

[75] Inventors: Toshihiko Kobayashi, Musashino; Tetsusaburo Kamibayashi, Niza, both of Japan

[73] Assignee: Kokusai Denshin Denwa Kabushiki Kaisha, Tokyo, Japan

[21] Appl. No.: 55,279

[22] Filed: Jul. 6, 1979

[30] Foreign Application Priority Data

Jul. 7, 1978 [JP] Japan .................... 53-81975

[51] Int. Cl.³ ............ G01R 33/00; G01B 7/14; G08C 21/00
[52] U.S. Cl. .................... 178/18; 178/19; 324/262; 324/208
[58] Field of Search ............... 324/207, 208; 332/148; 178/18, 19, 20

[56] References Cited

U.S. PATENT DOCUMENTS 3,134,099  5/1964  Woo .................................. 178/18
3,684,828  8/1972  Maher .............................. 178/18

*Primary Examiner*—Gerard R. Strecker
*Assistant Examiner*—Walter E. Snow
*Attorney, Agent, or Firm*—Robert E. Burns; Emmanuel J. Lobato; Bruce L. Adams

[57] ABSTRACT

A coordinate reader comprising: a magnetostrictive plate, a plurality of excitation means each including at least three coils mounted on the magnetostrictive plate in two directions of coordinate axes along its marginal edges for generating magnetostrictive oscillation waves in the magnetostrictive plate, a detection coil employed to be placed at a desired position on the propagation paths of the magnetostrictive oscillation waves, and measuring means for obtaining a numerical value of the coordinates of the position of the detection coil from a time difference between the excitation of the magnetostrictive plate by the excitation means and the detected output from the detection coil. Adjusting means is provided for adjusting the measuring means so that when the detection coil is disposed on the magnetostrictive plate at each position equally spaced from each of the coordinate axes, substantially equal numerical values are obtained from the excitation means.

8 Claims, 8 Drawing Figures

COORDINATE READER USING ADJUSTABLE MAGNETOSTRICTIVE OSCILLATIONS

BACKGROUND OF THE INVENTION

1. Field of the Invention

This invention relates to a coordinate reader which utilizes a delay time of a magnetostrictive oscillation wave propagating in a magnetostrictive plate.

2. Description of the Prior Art

A device of this kind comprises an input panel, an input pen and a controller and has widely been employed mainly as an input device for graphic data processing in the fields of electricity, communication, machinery, instrumentation, meteorology, medical science, etc. Such a device now rapidly comes into wide use, since it has a high resolution of about 0.25 mm and is highly reliable and inexpensive. However, the conventional device of this kind has a defect such that the accuracy of the measured coordinates is markedly lower at the peripheral part of the input panel as described below.

SUMMARY OF THE INVENTION

An object of this invention is to provide a coordinate reader using a magnetostrictive plate which can obtain the measured coordinates with high accuracy over the entire area of the magnetostrictive plate.

According to this invention, there is provided a coordinate reader comprising: a magnetostrictive plate, a plurality of excitation means each including at least three coils mounted on the magnetostrictive plate in two directions of coordinate axes along its marginal edges for generating magnetostrictive oscillation waves in the magnetostrictive plate, a detection coil employed to be placed at a desired position on the propagation paths of the magnetostrictive oscillation waves, measuring means for obtaining a numerical value of the coordinates of the position of the detection coil from a time difference between the excitation of the magnetostrictive plate by the excitation means and the detected output from the detection coil, and adjusting means for adjusting the measuring means so that when the detection coil is disposed on the magnetostrictive plate at each position equally spaced from each of the coordinate axes, substantially equal numerical values are obtained from the measuring means.

The adjusting means is constructed, for example, so that those of the plurality of coils of each of the plurality of excitation means which are disposed on the corner portions of the magnetostrictive plate can be slightly shifted in the axial direction of the coils.

The adjusting means is combined, as another example, with the excitation means in such a manner that the generation of the magnetostrictive oscillation wave by those of the plurality of coils of each excitation means which are disposed on the corner portions of the magnetostrictive plate is delayed relative to the generation of the magnetostrictive oscillation by the coil disposed at the middle portion.

BRIEF DESCRIPTION OF THE DRAWING

This invention will be hereinafter described in detail and compared with prior art, with reference to the accompanying drawing, in which:

FIGS. 6A and 6B are a block diagram and timing charts illustrating an example of the measuring circuit used in the present invention.

DETAILED DESCRIPTION OF THE INVENTION

For readily understanding the merits of this invention over the prior art, an example of the prior art will first be described.

Figure 1A:
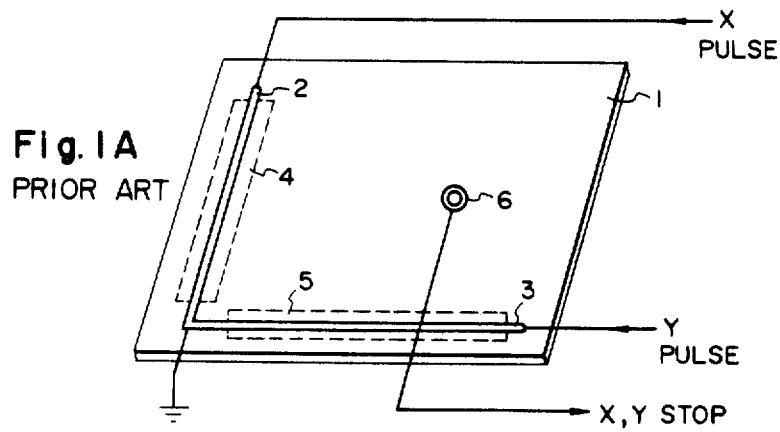
FIGS. 1A and 1B are a perspective view and a cross-sectional view explanatory of principles of an input panel of a conventional coordinate reader using a magnetostrictive plate.
Figure 1B:
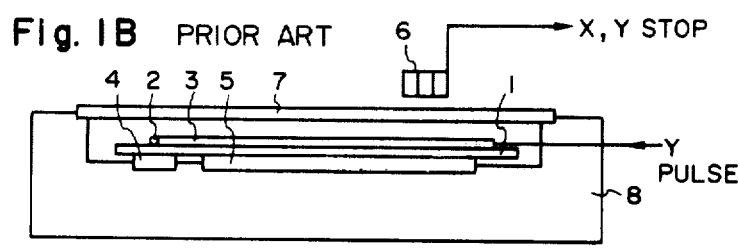

FIG. 1 illustrates the construction of a conventional input panel, the views shown in FIG. 1A and FIG. 1B being from the top and one side of the input panel, respectively. A single X-direction excitation line 2 and a single Y-direction excitation line 3 are mounted on a magnetostrictive plate 1 along its marginal edges in the X- and Y-directions, as shown in FIG. 1A. As depicted in FIG. 1B, after the assembly is fixed to a base 8, a facing member 7 serving as a data surface is disposed above the magnetostrictive plate 1. Permanent magnets 4 and 5 respectively disposed under the excitation lines 2, 3 are to enhance the ratio of generation of magnetostrictive oscillation and need not always be provided. If now an X pulse is applied to the X-direction excitation line 2, with an input pen having incorporated therein a detection coil 6 being placed on the input panel at a desired point, those portions of magnetostrictive plate 1 making contact with the X-direction excitation line 2 simultaneously generate magnetostrictive oscillation waves. The oscillation waves propagate in the magnetostrictive plate 1 towards the other end and when the oscillation waves reach the detection coil 6, a magnetic flux change by the oscillation waves induces a voltage in the detection coil 6. Accordingly, by introducing clock pulses (2) through an AND gate 52, under control of a flip-flop 51, to an external counter 53 as counter input pulses (5) for counting simultaneously with the application of the X-direction pulse (1) and by stopping the counting upon detection of the output (3) from the detection coil 6, as shown in FIGS. 6A and 6B. The X coordinate of the position of the input pen can be obtained as a numerical value in a register 54 connected to the counter 53 from a time difference between the application of the X pulse (1) and the detection of the output (3) from the detecting coil 6, that is, a delay time of the magnetostrictive oscillation wave. The count of the counter 53 is transferred to the register 54, and the value of the content of the register 54 is displayed on a suitable display device in a usual manner. Next, the Y coordinate of the location of the input pen is obtained by applying a Y-direction pulse (1) to the Y-direction excitation line 3 as in exactly the same manner as described above; thus the X and Y coordinate of the position of the input pen can be determined. However, such a method of simultaneously exciting the magnetostrictive plate 1 with a single excitation line 2 or 3 has a defect of markedly lowered accuracy for the following reason. That is, the voltage induced in the detection coil 6 placed on the magnetostrictive plate 1 at a desired position is a resultant value of magnetic flux changes caused by magnetostrictive oscillation waves from the respective portions of the magnetostrictive plate 1 just under the excitation line 2 or 3, so that the composite waveforms differ from one another at positions on the magnetostrictive plate 1, i.e. at its central or peripheral part, even if equally spaced from the excitation line 2 or 3, and this results in a difference in the delay time.

Figure 2:
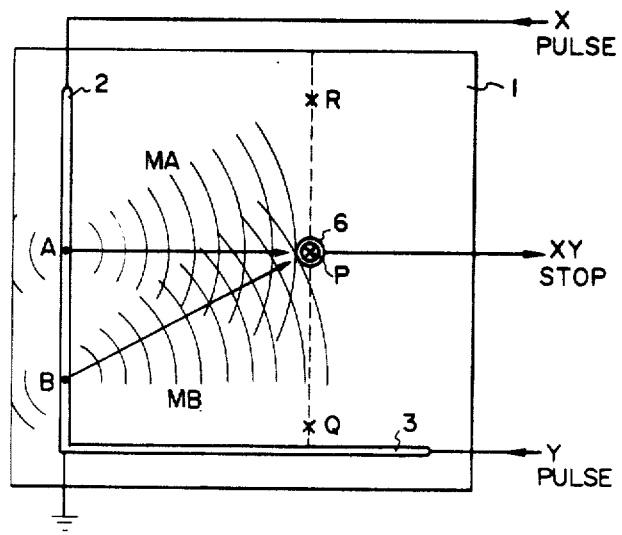
FIG. 2 is a plan view explanatory of a defect of the conventional coordinate reader.

FIG. 2 is explanatory of the above. A voltage is induced in the detection coil 6 placed on the magnetostrictive plate 1 at a point P which is a resultant value of flux changes induced by a magnetostrictive oscillation wave MA generated from the portion of the magnetostrictive plate 1 at a point A nearest to the point P just under the excitation line 2 and by a magnetostrictive oscillation wave MB from a point other than the point A, for example, a point B. In practice, the points other than the point A are numberless, not only the single point B, and flux changes by magnetostrictive oscillation waves from these numberless points are added with one another. If the magnetostrictive plate 1 and the excitation line 2 are infinitely long, the above-said resultant waveform is the same on a straight line RPQ parallel to the excitation line 2; but for the case that they are finite, the resultant waveform varies at each location on the magnetostrictive plate 1. On top of that, the delay time at that point is measured on the basis of the building-up time of the induced voltage including the above-said resultant waveform induced in the detecting coil 6, so that different resultant waveforms result in a difference in the delay time even at the same distance from the excitation line 2 (or 3).

Experimental results reveal that a difference in the delay time is marked between the point A of the middle portion and the point R or Q of the peripheral portion and that this difference tends to increase with an increase in the distance from the excitation line 2 (or 3). Therefore, for applications requiring highly accurate reading, the purpose cannot be achieved unless the magnetostrictive plate 1 is about twice as large as the coordinate surface actually needed so as not to use its peripheral portion.

This invention provides a coordinate reader using a magnetostrictive plate which is free from such a defect as mentioned above.

The present invention will hereinafter be described in detail.

Figure 3:
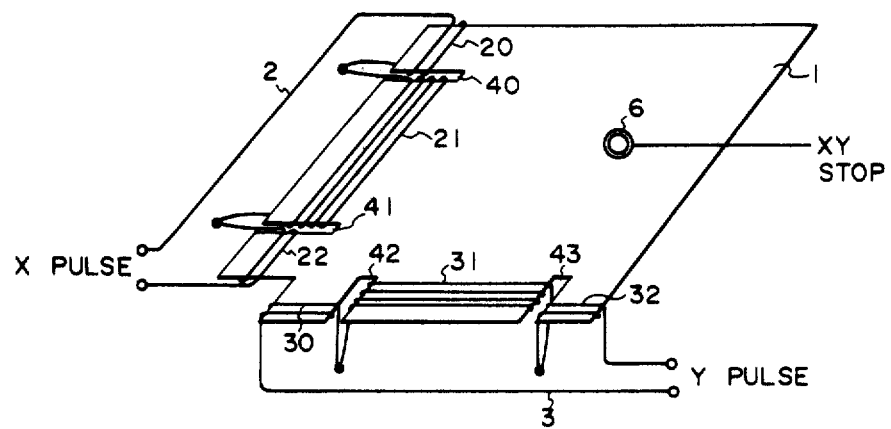
FIGS. 3 and 5 are a perspective view and a plan view illustrating embodiments of this invention.

FIG. 3 is explanatory of principles of an input panel, illustrating an embodiment of this invention. As shown, four recesses 40, 41, 42 and 43 are formed in the marginal portions of the magnetostrictive plate 1 and, using the recesses, three coils 20, 21 and 22 and three coils 30, 31, 32 are wound to provide X- and Y-direction excitation lines, respectively; these coils are connected so that they are in-phase or out-of-phase with each other, and X- and Y-direction pulses are applied to them.

Figure 4:
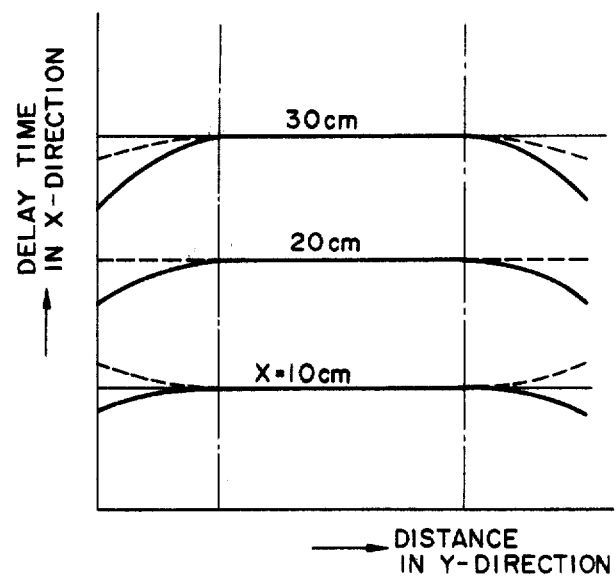
FIG. 4 is a characteristic diagram explanatory of the effect of this invention.

In a case of exciting the magnetostrictive plate with a single excitation line as in the prior art, the delay time at each point on a line spaced by 10 cm apart from, for example, an X-direction excitation line and parallel thereto is substantially the same at the middle portion of that line but appreciably less at end portions of the line, as shown in FIG. 4. This tendency grows as the distance from the X-direction excitation line increases to 20 cm, 30 cm, . . . , so that high accuracy cannot be obtained with a single excitation line.

In the input panel of this invention, however, since the excitation line is composed of the three coils 20, 21 and 22 or the three coils 30, 31 and 32, the difference in the delay time between the middle and peripheral portions of the magnetostrictive plate 1 can be corrected by changing the positions of the central coil 21 and the end coils 20 and 22 of the X-direction excitation line 2 through the use of, for example, a slidable coil bobbin. If such a correction is made for the distance of 20 cm from the X-direction excitation line, the difference in the delay time can be removed, as indicated by the broken lines in FIG. 4. In this case, the correcting operation can be readily performed when the width of the central coil is about {(width of magnetostrictive plate-)—7 cm} and the width of each end coil is smaller than half the remaining width. If the central coil further approaches both the ends of the plate, the variable range of delay time is reduced to make sufficient correction impossible, whereas if the recesses 40, 41, 42 and 43 are formed closer towards the central portion of the plate, a change in the delay time by the correction is caused not only at the peripheral portion but also at the central portion, making the correcting operation complicated. Further, the central and end coils may be of the same or different number of turns but high accuracy can be obtained more easily when the number of turns of each end coil is smaller than that of the central coil.

Figure 5:
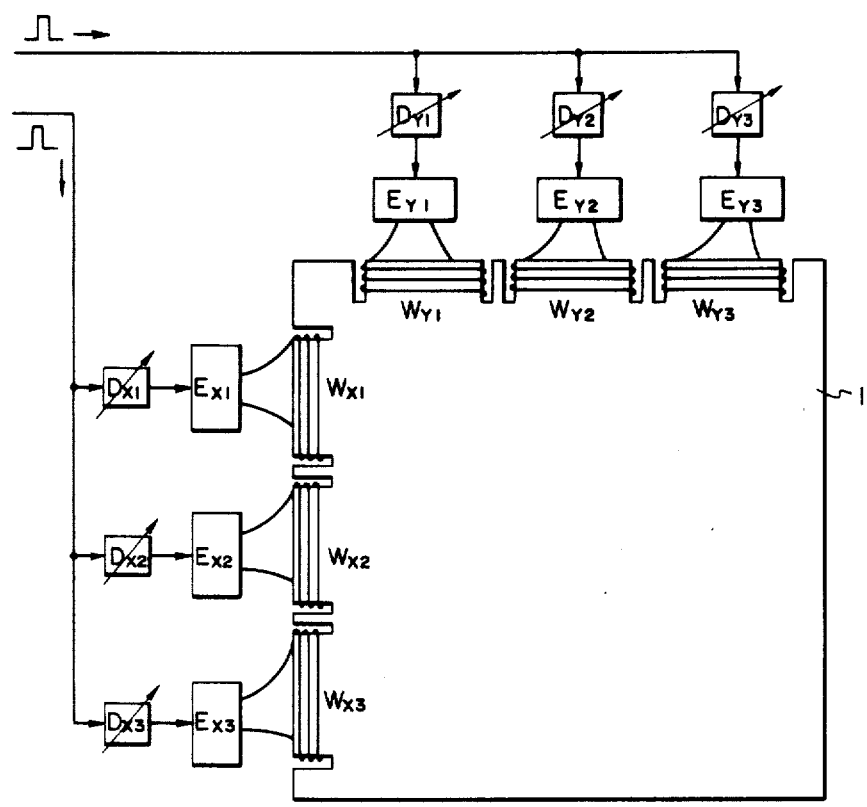

Next, exactly the same correction as described above can be achieved by applying a respective one of two exciting pulses having a required time difference to a respective combination of the two end coils and the central coil, and adjusting a time difference among the three coils at which the respective one of the exciting pulses is applied to the three coils, as shown in FIG. 5. In FIG. 5, to Y- and X-direction three coils $W_{y1}$ to $W_{y3}$ and $W_{x1}$ to $W_{x3}$ on the magnetostrictive plate 1 are respectively connected exciting pulse generators $E_{y1}$ to $E_{y3}$ and $E_{x1}$ to $E_{x3}$ and variable delay elements $D_{y1}$ to $D_{y3}$ and $D_{x1}$ to $D_{x3}$, by which pulses to the coils can be electrically adjusted in delay time. In the example of FIG. 5, the plurality of coils are mounted on the magnetostrictive plate 1 over the entire width thereof but may also be disposed at suitable intervals.

The present invention has been described with respect to the embodiments in which the excitation lines are each comprised of three coils, but the invention is naturally applicable to cases where each excitation line is composed of more than three coils; and as the number of coils increases, accuracy of the correction rises. In this instance, however, the correcting operation becomes complicated.

As has been described above in detail, this invention provides for enhanced accuracy in coordinate reading by a very simple method while retaining the advantages of the coordinate reader using a magnetostrictive plate, which has the features of simple construction and inexpensiveness, and further the invention produces other effects, such as efficient use of the magnetostrictive plate.

What we claim is:

1. A coordinate reader comprising: a magnetostrictive plate, a plurality of excitation means each including at least three coils mounted on the magnetostrictive plate in two directions of coordinate axes along its marginal edges for generating magnetostrictive oscillation waves in the magnetostrictive plate, a detection coil employed to be placed at a desired position on the propagation paths of the magnetostrictive oscillation waves, measuring means for obtaining a numerical value of the coordinates of the position of the detection coil from a time difference between the excitation of the magnetostrictive plate by the excitation means and the detected output from the detection coil, and adjusting means for adjusting said excitation means so as to adjust the numerical value obtained by said measuring means so that when the detection coil is disposed on the magnetostrictive plate at each position equally spaced from each of the coordinate axes, substantially equal numerical values are obtained from the measuring means.

2. A coordinate reader, comprising:

a magnetostrictive plate capable of sustaining magnetostrictive oscillations;

a plurality of excitation means for exciting magnetostrictive oscillations within said magnetostrictive plate and which propagate through said magnetostrictive plate in a direction defining a coordinate axis, each excitation means comprised of at least three excitation coils in a row, and each row of said excitation coils mounted on said magnetostrictive plate along a respective marginal edge thereof and electrically energizable for exciting the magnetostrictive oscillations within said magnetostrictive plate;

a detection coil positionable on said coordinate plate and interactive with magnetostrictive oscillations within said magnetostrictive plate for developing a voltage induced by said magnetostrictive oscillations;

measuring means responsive to electrical signals that energize said excitation coils and responsive to the voltage induced in said detection coil for measuring a time difference between a time when the electrical signals are applied to energize said excitation coils and a time when the voltage is induced in said detection coil and for generating an output signal representative of the distance of said detection coil from said excitation coils based on the measured time difference; and wherein at least the end excitation coils of the rows of said excitation coils are movable along the direction of propagation of the magnetostrictive oscillations which are excited when said excitation coils are energized to permit positioning said end excitation coils for establishing magnetostrictive oscillations that generate substantially equal distance values when said detection coil is disposed on every position on said magnetostrictive plate that is equally spaced from the respective rows of said excitation coils.

3. A coordinate reader, comprising:

a magnetostrictive plate capable of sustaining magnetostrictive oscillations;

a plurality of excitation means for exciting magnetostrictive oscillations within said magnetostrictive plate and which propagate through said magnetostrictive plate in a direction defining a coordinate axis, each excitation means comprised of at least three excitation coils in a row, and each row of said excitation coils mounted on said magnetostrictive plate along a respective marginal edge thereof and electrically energizable for exciting the magnetostrictive oscillations within said magnetostrictive plate;

a detection coil positionable on said coordinate plate and interactive with magnetostrictive oscillations within said magnetostrictive plate for developing a voltage induced by said magnetostrictive oscillations;

measuring means responsive to electrical signals that energize said excitation coils and responsive to the voltage induced in said detection coil for measuring a time difference between a time when the electrical signals are applied to energize said excitation coils and a time when the voltage is induced in said detection coil and for generating an output signal representative of the distance of said detection coil from said excitation coils based on the measured time difference; and means for delaying energization of the end coils of a row of said excitation coils relative to energization of a middle coil of the row of said excitation coils so that magnetostrictive oscillations excited by said end excitation coils are delayed relative to magnetostrictive oscillations excited by said middle excitation coil.

4. In a coordinate reader:

a magnetostrictive plate capable of sustaining magnetostrictive oscillations;

at least two rows of excitation coils each comprised of at least three excitation coils and each said row of excitation coils disposed along a respective marginal edge of said magnetostrictive plate, said excitation coils electrically energizable for exciting magnetostrictive oscillations within said magnetostrictive plate which propagate through said magnetostrictive plate in a direction defining a coordinate axis; and delay means for delaying magnetostrictive oscillations excited by end ones of the excitation coils in a row of said excitation coils relative to magnetostrictive oscillations excited by a middle one of the coils in the row of excitation coils.

5. In a coordinate reader according to claim 4:

said delay means comprising said marginal edge portions of said magnetostrictive plate having slots extending from the marginal edges inwardly of said magnetostrictive plate to define tabs comprised of portions of said magnetostrictive plate between respective pairs of said slots, said excitation coils each wound around a respective one of said tabs with the end ones of said excitation coils in a row of excitation coils movable along their respective tabs in the direction of said slots, and the end ones of said excitation coils in a row of excitation coils positioned relative to a middle excitation coil of the row of excitation coils for exciting magnetostrictive oscillations delayed relative to the magnetostrictive oscillations excited by the middle excitation coil.

6. In a coordinate reader according to claim 4:

said delay means responsive to an excitation signal for delaying the excitation signal applied to the end ones of said excitation coils in a row of excitation coils relative to the excitation signal applied to the middle one of the coils for delaying magnetostrictive oscillations excited by the end ones of said excitation coils in response to the delayed excitation signal relative to magnetostrictive oscillations excited by the middle one of the excitation coils.

7. In a coordinate reader according to claim 6: said delay means comprising a plurality of adjustable delay elements each corresponding to a respective excitation coil and receptive of an excitation signal for delaying the excitation signal by respective delays determined by the respective delay elements, and means for applying the respective delayed excitation signals to the corresponding excitation coils.

8. In a coordinate reader according to claim 7: said means for applying the respective delayed excitation signals comprising respective pulse generators each responsive to a delayed excitation signal from a corresponding delay element for applying a pulse to energize the excitation coil corresponding to the delay element from which the delayed excitation signal is received.

* * * * *